(12) United States Patent
Jin

(10) Patent No.: US 9,588,639 B2
(45) Date of Patent: Mar. 7, 2017

(54) APPLICATION DISPLAY METHOD AND APPARATUS

(71) Applicant: Huawei Technologies Co., Ltd., Shenzhen, Guangdong (CN)

(72) Inventor: Hongbo Jin, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/948,866

(22) Filed: Nov. 23, 2015

(65) Prior Publication Data

US 2016/0077679 A1 Mar. 17, 2016

Related U.S. Application Data

(63) Continuation of application No. PCT/CN2014/083699, filed on Aug. 5, 2014.

(30) Foreign Application Priority Data

Nov. 29, 2013 (CN) .......................... 2013 1 0633910

(51) Int. Cl.
| | |
|---|---|
| *H04M 11/00* | (2006.01) |
| *H04M 1/00* | (2006.01) |
| *G06F 3/0481* | (2013.01) |
| *G06F 9/48* | (2006.01) |
| *H04M 1/725* | (2006.01) |
| *H04W 8/18* | (2009.01) |
| *H04M 1/67* | (2006.01) |

(52) U.S. Cl.
CPC .......... *G06F 3/0481* (2013.01); *G06F 9/4843* (2013.01); *H04M 1/72522* (2013.01); *H04W 8/183* (2013.01); *H04M 1/67* (2013.01)

(58) Field of Classification Search
CPC ............ G06F 3/0481; H04M 1/72522; H04M 1/72569; H04W 8/183
USPC ......................................... 455/405, 407, 566
See application file for complete search history.

(56) References Cited

U.S. PATENT DOCUMENTS

| | | | |
|---|---|---|---|
| 2006/0156209 A1* | 7/2006 | Matsuura | G06Q 10/10 714/798 |
| 2010/0175025 A1 | 7/2010 | Lin | |
| 2011/0154262 A1 | 6/2011 | Lai et al. | |
| 2013/0187753 A1* | 7/2013 | Chiriyankandath | G06F 3/0488 340/5.51 |

(Continued)

FOREIGN PATENT DOCUMENTS

| | | |
|---|---|---|
| CN | 1754147 A | 3/2006 |
| CN | 101770339 A | 7/2010 |

(Continued)

*Primary Examiner* — Simon Nguyen

(57) ABSTRACT

Embodiments of the present invention provide an application display method and apparatus. A second application that has an association relationship with an application (a first application) that is currently displayed on a terminal is acquired according to a stored association relationship between applications of the terminal, and the second application is displayed after the first application exits. That is, an application that a user expects to use is predicted according to the stored association relationship between the applications, and a large amount of sensor data of the terminal and external data do not need to be collected, thereby improving processing performance of the terminal.

12 Claims, 1 Drawing Sheet

```
Acquire, according to a stored association
relationship between applications of a          ─── S101
terminal, a second application that has an
association relationship with a first application

│
            ▼

Display the second application after the first  ─── S102
          application exits
```

(56) References Cited

U.S. PATENT DOCUMENTS

| | | | |
|---|---|---|---|
| 2013/0339284 A1* | 12/2013 | Rowles | G06Q 30/02 706/46 |
| 2014/0019510 A1* | 1/2014 | Kamiya | H04M 1/72569 709/201 |
| 2014/0101611 A1* | 4/2014 | Lang | G06F 21/32 715/813 |
| 2014/0188868 A1* | 7/2014 | Hunter | G06F 17/30091 707/736 |
| 2014/0189572 A1* | 7/2014 | Martens | G06F 3/04817 715/780 |
| 2014/0365505 A1* | 12/2014 | Clark | G06F 17/30864 707/748 |
| 2015/0088955 A1* | 3/2015 | Hendrick | H04L 67/10 709/201 |
| 2015/0113471 A1* | 4/2015 | Engstrom | G06F 3/0481 715/781 |
| 2015/0200815 A1* | 7/2015 | Verkasalo | G06F 17/30867 707/740 |
| 2015/0373107 A1* | 12/2015 | Chan | H04W 4/003 709/205 |

FOREIGN PATENT DOCUMENTS

| CN | 102104666 A | 6/2011 |
|---|---|---|
| CN | 103593479 A | 2/2014 |

\* cited by examiner

APPLICATION DISPLAY METHOD AND APPARATUS

CROSS-REFERENCE TO RELATED APPLICATIONS

This application is a continuation of International Application No. PCT/CN2014/083699, filed on Aug. 5, 2014, which claims priority to Chinese Patent Application No. 201310633910.9, filed on Nov. 29, 2013, both of which are hereby incorporated by reference in their entireties.

TECHNICAL FIELD

Embodiments of the present invention relate to computer technologies, and in particular, to an application (Application, hereinafter referred to as APP) display method and apparatus.

BACKGROUND

With the development of computer technologies, types of APPs continuously increase, and more and more APPs are installed on a terminal. How to display APPs so as to make it more convenient for a user to search for a desired APP becomes a key technology.

In the prior art, sensor data of a terminal and external environment data are collected; a context environment in which the terminal is located is analyzed by using historical empirical data; APPs that may be used by a user are predicted according to the context environment in which the terminal is located; and the predicted APPs are sorted according to probabilities and displayed on a screen, so as to facilitate selection of a desired APP by the user.

However, according to a method in the prior art, a large amount of sensor data of a terminal and external data need to be collected. Calculation is complex and an amount of calculation is large, which degrades processing performance of the terminal.

SUMMARY

Embodiments of the present invention provide an application display method and apparatus, so as to improve processing performance of a terminal.

According to a first aspect, an embodiment of the present invention provides an application display method, including:

acquiring, according to a stored association relationship between applications of a terminal, a second application that has an association relationship with a first application, where the first application is an application that is currently displayed on the terminal, and the association relationship between the applications is a sequential association relationship and/or a combinational association relationship; and displaying the second application after the first application exits.

With reference to the first aspect, in a first possible implementation manner, before the acquiring, according to a stored association relationship between applications of a terminal, a second application that has an association relationship with a first application, the method further includes:

establishing and storing the association relationship between the applications of the terminal according to log information generated when a user uses the applications of the terminal.

With reference to the first possible implementation manner, in a second possible implementation manner, when the association relationship between the applications is the sequential association relationship, the establishing and storing the association relationship between the applications of the terminal according to log information generated when a user uses the applications of the terminal includes:

acquiring, according to the log information generated when the user uses the applications of the terminal, times at which the user uses the applications of the terminal, and sequentially sorting the applications according to a sequence of the times at which the user uses the applications of the terminal;

mining a frequent subsequence between the applications by using a time series frequent subsequence mining algorithm;

using a frequent subsequence that satisfies a minimum support level and/or confidence level as the sequential association relationship between the applications; and storing the sequential association relationship between the applications.

With reference to the first aspect, in a third possible implementation manner, when the association relationship between the applications is the combinational association relationship, the establishing and storing the association relationship between the applications of the terminal according to log information generated when a user uses the applications of the terminal includes:

acquiring, according to the log information generated when the user uses the applications of the terminal, a set of applications that are used by the user within a preset time period;

mining a frequent item set between the applications by using a frequent item mining algorithm;

using a frequent item set that satisfies a minimum support level and/or confidence level as the combinational association relationship between the applications; and storing the combinational association relationship between the applications.

With reference to the first aspect or any one possible implementation manner of the first to the third possible implementation manners of the first aspect, in a fourth possible implementation manner, the displaying the second application after the first application exits includes:

after the first application exits, displaying the second application on a next screen if a screen of a mobile phone is unlocked.

With reference to the first aspect or any one possible implementation manner of the first to the third possible implementation manners of the first aspect, in a fifth possible implementation manner, the displaying the second application after the first application exits includes:

after the first application exits, displaying the second application in an unlocking interface if a screen of a mobile phone is locked.

According to a second aspect, an embodiment of the present invention provides an application display apparatus, including:

a processing module, configured to acquire, according to a stored association relationship between applications of a terminal, a second application that has an association relationship with a first application, where the first application is an application that is currently displayed on the terminal, and the association relationship between the applications is a sequential association relationship and/or a combinational association relationship; and a display module, configured to display the second application after the first application exits.

With reference to the second aspect, in a first possible implementation manner, the processing module is further configured to: before acquiring, according to the stored association relationship between the applications of the terminal, the second application that has the association relationship with the first application, establish and store the association relationship between the applications of the terminal according to log information generated when a user uses the applications of the terminal.

With reference to the first possible implementation manner, in a second possible implementation manner, when the association relationship between the applications is the sequential association relationship, the processing module is specifically configured to: acquire, according to the log information generated when the user uses the applications of the terminal, times at which the user uses the applications of the terminal, and sequentially sort the applications according to a sequence of the times at which the user uses the applications of the terminal; mine a frequent subsequence between the applications by using a time series frequent subsequence mining algorithm; use a frequent subsequence that satisfies a minimum support level and/or confidence level as the sequential association relationship between the applications; and store the sequential association relationship between the applications.

With reference to the second aspect, in a third possible implementation manner, when the association relationship between the applications is the combinational association relationship, the processing module is specifically configured to: acquire, according to the log information generated when the user uses the applications of the terminal, a set of applications that are used by the user within a preset time period; mine a frequent item set between the applications by using a frequent item mining algorithm; use a frequent item set that satisfies a minimum support level and/or confidence level as the combinational association relationship between the applications; and store the combinational association relationship between the applications.

With reference to the second aspect or any one possible implementation manner of the first to the third possible implementation manners of the second aspect, in a fourth possible implementation manner, the display module is specifically configured to: after the first application exits, display the second application on a next screen if a screen of a mobile phone is unlocked.

With reference to the second aspect or any one possible implementation manner of the first to the third possible implementation manners of the second aspect, in a fifth possible implementation manner, the display module is specifically configured to: after the first application exits, display the second application in an unlocking interface if a screen of a mobile phone is locked.

According to the application display method and apparatus provided in the embodiments of the present invention, a second application that has an association relationship with an application (a first application) that is currently displayed on a terminal is acquired according to a stored association relationship between applications of the terminal, and the second application is displayed after the first application exits. That is, an application that a user expects to use is predicted according to the stored association relationship between the applications, and a large amount of sensor data of the terminal and external data do not need to be collected, thereby improving processing performance of the terminal.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

A core idea of the present invention is to predict, based on an association relationship between applications, an application that a user expects to use, and display the application. The association relationship between applications may be acquired according to log information generated when a user uses applications of a terminal, that is, the association relationship between the applications is established according to the user's habit of using the applications. When the technical solution in the present invention is used to predict an application, which is to be used by the user, of the terminal, the application may be predicted according to the stored association relationship between the applications, and a large amount of sensor data of the terminal and external data does not need to be collected, thereby improving processing performance of the terminal.

Figure 1:
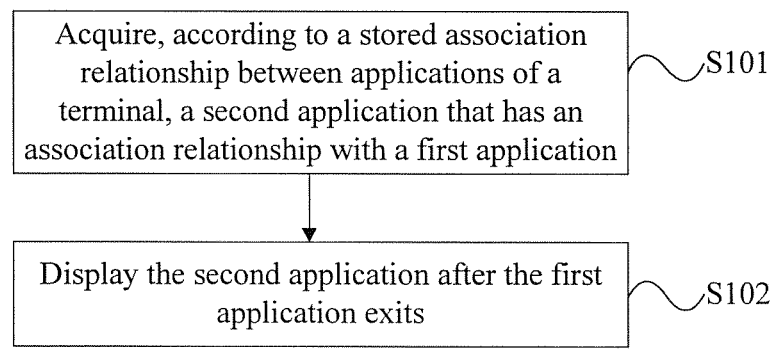
FIG. 1 is a schematic flowchart of an application display method according to an embodiment of the present invention.

FIG. 1 is a schematic flowchart of an application display method according to an embodiment of the present invention. This embodiment is executed by a terminal device. As shown in FIG. 1, the method in this embodiment includes:

S101: Acquire, according to a stored association relationship between applications of a terminal, a second application that has an association relationship with a first application.

The foregoing first application is an application that is currently displayed on the terminal, and the foregoing association relationship between the applications is a sequential association relationship and/or a combinational association relationship.

That is, a second application that has the sequential association relationship with the first application may be acquired; or a second application that has the combinational association relationship with the first application may be acquired; or a second application that has the sequential association relationship with the first application and has the combinational association relationship with the first application may be acquired.

The association relationship between the applications may be established according to log information generated when a user uses the applications of the terminal.

Specifically, the sequential association relationship between the applications is established and stored as follows according to the log information generated when the user uses the applications of the terminal:

Step 1: Acquire, according to the log information generated when the user uses the applications of the terminal, times at which the user uses the applications of the terminal, and sequentially sort the applications according to a sequence of the times at which the user uses the applications of the terminal. For example, the terminal of the user includes five applications, which are an application 1, an application 2, an application 3, an application 4, and an application 5, and the applications are sequentially sorted according to a sequence of times at which the user uses the applications of the terminal as the application 1, the application 3, the application 4, the application 2, the application 3, the application 4, the application 5, the application 2, the application 3, the application 4, the application 1, the application 3, the application 2, the application 3, and the application 4.

Step 2: Mine a frequent subsequence between the applications by using a time series frequent subsequence mining algorithm.

The time series frequent subsequence mining algorithm may be an existing algorithm, for example, a Sequential PAttern Discovery using Equivalence classes (Sequential PAttern Discovery using Equivalence classes, SPADE for short) algorithm.

Step 3: Use a frequent subsequence that satisfies a minimum support level and/or confidence level as the sequential association relationship between the applications.

Step 4: Store the foregoing sequential association relationship between the applications.

Generally, by using the log information generated when the user uses the applications of the terminal, multiple frequent subsequences that satisfy the minimum support level and/or confidence level may be mined and used as the sequential association relationship of the applications, for example, subsequences: the application 2, the application 3, and the application 4; that is, a probability that the user uses the application 3 after using the application 2 and uses the application 4 after using the application 3 is large. Therefore, when an application that is currently used by the user is the application 2, the terminal may predict that the user will use the application 3 and the application 4 subsequently. Therefore, when the user exits the application 2, the application 3 and the application 4 are displayed in order on a next screen. More specifically, a habit of the user is to make a call after viewing a short message service message, translate a new word after reading an English magazine, and search for a dynamic of a company after viewing a stock market. A short message service application and a call application are in a sequential association relationship; an English magazine application and an English dictionary application are in a sequential association relationship; and a stock quotation application and a search engine application are in a sequential association relationship. The terminal may acquire, according to sequential association relationships between these applications, the second application that has the association relationship with the first application.

The combinational association relationship between the applications is established and stored as follows according to the log information generated when the user uses the applications of the terminal:

Step 1: Acquire, according to the log information generated when the user uses the applications of the terminal, a set of applications that are used by the user within a preset time period.

Step 2: Mine a frequent item set between the applications by using a frequent item mining algorithm.

For example, an Apriori (Apriori) association rule mining algorithm is used to mine the frequent item set between the applications.

Step 3: Use a frequent item set that satisfies a minimum support level and/or confidence level as the combinational association relationship between the applications.

Step 4: Store the foregoing combinational association relationship between the applications.

For example, when making a travel plan, the user may simultaneously use the following several applications: plane ticket reservation, hotel reservation, weather forecast, food query, and the like. For another example, in a case of working in an office, the user may use applications such as email, file management, instant messaging, phone, and memorandum. Therefore, it may be considered that there is a combinational association relationship between the plane ticket reservation, the hotel reservation, the weather forecast, and the food query, and it may be considered that there is a combinational association relationship between the email, the file management, the instant messaging, the phone, and the memorandum.

That is, when the user reserves a plane ticket, there is a great probability that the user will use the applications such as the hotel reservation, the weather forecast, and the food query subsequently. Therefore, when displaying an application in a combinational association relationship, the terminal may predict that the user will use other applications in the combinational association relationship. Therefore, when a current application exits, other applications in the combinational association relationship are displayed. Optionally, when applications in a combination association relationship are also in a sequential association relationship, for a sequence of displaying other applications in the combination association relationship, reference may be made to a sequence in the sequential association relationship.

S102: Display the second application after the first application exits.

After the user exits a currently used application, the foregoing second application is displayed on a next screen if a screen of a mobile phone is unlocked, or the foregoing second application is displayed in an unlocking interface if a screen of a mobile phone is locked.

In this embodiment, a second application that has an association relationship with an application (a first application) that is currently displayed on a terminal is acquired according to a stored association relationship between applications of the terminal, and the second application is displayed after the first application exits. That is, an application that a user expects to use is predicted according to the stored association relationship between the applications, and a large amount of sensor data of the terminal and external data do not need to be collected, thereby improving processing performance of the terminal.

Figure 2:
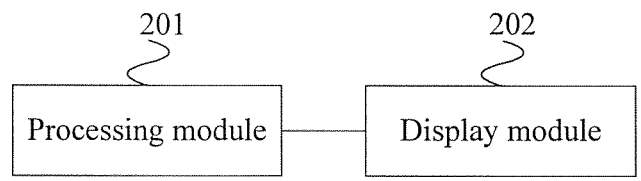
FIG. 2 is a schematic structural diagram of an application display apparatus according to an embodiment of the present invention.

FIG. 2 is a schematic structural diagram of an application display apparatus according to an embodiment of the present invention. The apparatus in this embodiment includes a processing module 201 and a display module 202. The processing module 201 is configured to acquire, according to a stored association relationship between applications of a terminal, a second application that has an association relationship with a first application, where the foregoing first application is an application that is currently displayed on the terminal, and the foregoing association relationship between the applications is a sequential association relationship and/or a combinational association relationship. The display module 202 is configured to display the foregoing second application after the foregoing first application exits.

In the foregoing embodiment, the foregoing processing module 201 is further configured to: before acquiring, according to the stored association relationship between the applications of the terminal, the second application that has the association relationship with the first application, establish and store the association relationship between the applications of the terminal according to log information generated when a user uses the applications of the terminal.

In the foregoing embodiment, when the foregoing association relationship between the applications is the sequential association relationship, the foregoing processing module 201 is specifically configured to: acquire, according to the log information generated when the user uses the applications of the terminal, times at which the user uses the applications of the terminal, and sequentially sort the applications according to a sequence of the times at which the user uses the applications of the terminal; mine a frequent subsequence between the applications by using a time series frequent subsequence mining algorithm; use a frequent subsequence that satisfies a minimum support level and/or confidence level as the sequential association relationship between the applications; and store the foregoing sequential association relationship between the applications.

In the foregoing embodiment, when the foregoing association relationship between the applications is the combinational association relationship, the foregoing processing module 201 is specifically configured to: acquire, according to the log information generated when the user uses the applications of the terminal, a set of applications that are used by the user within a preset time period; mine a frequent item set between the applications by using a frequent item mining algorithm; use a frequent item set that satisfies a minimum support level and/or confidence level as the combinational association relationship between the applications; and store the foregoing combinational association relationship between the applications.

In the foregoing embodiment, the foregoing display module 202 is specifically configured to: after the foregoing first application exits, display the foregoing second application on a next screen if a screen of a mobile phone is unlocked.

In the foregoing embodiment, the foregoing display module 202 is specifically configured to: after the foregoing first application exits, display the foregoing second application in an unlocking interface if a screen of a mobile phone is locked.

Modules in the foregoing apparatus embodiment may be accordingly configured to implement the technical solution in the method embodiment shown in FIG. 1, and implementation principles and technical effects are similar and details are not described herein.

Persons of ordinary skill in the art may understand that all or a part of the steps of the foregoing method embodiments may be implemented by a program instructing relevant hardware. The foregoing program may be stored in a computer-readable storage medium. When the program runs, the steps of the foregoing method embodiments are performed. The foregoing storage medium includes: any medium that can store program code, such as a ROM, a RAM, a magnetic disc, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof; however, these modifications or replacements do not make the essence of corresponding technical solutions depart from the scope of the technical solutions in the embodiments of the present invention.

What is claimed is:

1. An application display method, comprising:
   establishing and storing a plurality of association relationships between applications of a terminal according to log information generated when a user uses the applications, wherein each association relationship between the applications is at least one of a sequential association relationship or a combinational association relationship;
   acquiring, according to the stored association relationships between the applications, a second application that has an association relationship with a first application, wherein the first application is currently displayed on the terminal; and
   displaying the second application after the first application exits,
   wherein when a first one of the association relationships between the applications is the sequential association relationship, establishing the first association relationship comprises:
      acquiring, according to the generated log information, times at which the user uses the applications, and sequentially sorting the applications according to a sequence of the times at which the user uses the applications;
      mining a frequent subsequence between the applications by using a time series frequent subsequence mining algorithm; and
      using a frequent subsequence that satisfies at least one of a minimum support level or a confidence level as the sequential association relationship.

2. The method according to claim 1, wherein when the first one of the association relationships between the applications is the sequential association relationship, the method further comprises:
   storing the sequential association relationship between the applications.

3. The method according to claim 1, wherein when the first one of the association relationships between the applications is the combinational association relationship, establishing and storing the first association relationship comprises:
   acquiring, according to the generated log information, a set of applications that are used by the user within a preset time period;
   mining a frequent item set between the applications by using a frequent item mining algorithm;
   using a frequent item set that satisfies at least one of a minimum support level or a confidence level as the combinational association relationship between the applications; and
   storing the combinational association relationship between the applications.

4. The method according to claim 1, wherein displaying the second application after the first application exits comprises:
   after the first application exits, displaying the second application on a next screen if a screen of a mobile phone is unlocked.

5. The method according to claim 1, wherein displaying the second application after the first application exits comprises:

after the first application exits, displaying the second application in an unlocking interface if a screen of a mobile phone is locked.

6. The method according to claim 1, wherein the time series frequent subsequence mining algorithm comprises a sequential pattern discovery using equivalence classes (SPADE) algorithm.

7. An application display apparatus, comprising:
a processing module, configured to:
establish and store a plurality of association relationships between applications of a terminal according to log information generated when a user uses the applications, wherein each association relationship between the applications is at least one of a sequential association relationship or a combinational association relationship;
acquire, according to the stored association relationships between the applications, a second application that has an association relationship with a first application, wherein the first application is currently displayed on the terminal; and
a display module, configured to display the second application after the first application exits,
wherein when a first one of the association relationships between the applications is the sequential association relationship, the processing module is configured to:
acquire, according to the generated log information, times at which the user uses the applications, and sequentially sorting the applications according to a sequence of the times at which the user uses the applications;
mine a frequent subsequence between the applications by using a time series frequent subsequence mining algorithm; and
use a frequent subsequence that satisfies at least one of a minimum support level or a confidence level as the sequential association relationship.

8. The apparatus according to claim 7, wherein when the first one of the association relationships between the applications is the sequential association relationship, the processing module is further configured to:
store the sequential association relationship between the applications.

9. The apparatus according to claim 7, wherein when the first one of the association relationships between the applications is the combinational association relationship, the processing module is configured to:
acquire, according to the generated log information, a set of applications that are used by the user within a preset time period;
mine a frequent item set between the applications by using a frequent item mining algorithm;
use a frequent item set that satisfies at least one of a minimum support level or a confidence level as the combinational association relationship between the applications; and
store the combinational association relationship between the applications.

10. The apparatus according to claim 7, wherein the display module is configured to: after the first application exits, display the second application on a next screen if a screen of a mobile phone is unlocked.

11. The apparatus according to claim 7, wherein the display module is configured to: after the first application exits, display the second application in an unlocking interface if a screen of a mobile phone is locked.

12. The apparatus according to claim 7, wherein the time series frequent subsequence mining algorithm comprises a sequential pattern discovery using equivalence classes (SPADE) algorithm.

\* \* \* \* \*